United States Patent
Derscheid (10) Patent No.: US 11,071,255 B2
(45) Date of Patent: Jul. 27, 2021

(54) WEAR RESISTANT PRECUTTER KNIFE

(71) Applicant: DEERE & COMPANY, Moline, IL (US)

(72) Inventor: Daniel E. Derscheid, Hedrick, IA (US)

(73) Assignee: DEERE & COMPANY, Moline, IL (US)

( * ) Notice: Subject to any disclaimer, the term of this patent is extended or adjusted under 35 U.S.C. 154(b) by 456 days.

(21) Appl. No.: 15/919,532

(22) Filed: Mar. 13, 2018

(65) Prior Publication Data

US 2019/0281768 A1    Sep. 19, 2019

(51) Int. Cl.
| | |
|---|---|
| *A01F 15/10* | (2006.01) |
| *A01F 29/02* | (2006.01) |
| *A01D 90/04* | (2006.01) |
| *A01D 90/06* | (2006.01) |
| *A01F 29/09* | (2010.01) |
| *B02C 18/18* | (2006.01) |

(Continued)

(52) U.S. Cl.
CPC .............. *A01F 29/09* (2013.01); *A01D 90/04* (2013.01); *A01D 90/06* (2013.01); *A01F 15/10* (2013.01); *A01F 29/02* (2013.01); *B02C 18/18* (2013.01); *A01F 15/00* (2013.01); *A01F 2015/107* (2013.01); *A01F 2015/108* (2013.01); *B02C 2018/188* (2013.01); *B02C 2210/02* (2013.01); *B23P 15/28* (2013.01)

(58) Field of Classification Search
CPC ........ A01F 15/10; A01F 29/00; A01F 29/005; A01F 29/01; A01F 29/09; A01F 2015/107; A01F 2015/108; A01D 90/04; A01D 90/06; B02C 18/18

USPC ..................................... D8/7, 9, 12; D15/28
See application file for complete search history.

(56) References Cited

U.S. PATENT DOCUMENTS

| | | | |
|---|---|---|---|
| 2,757,697 | A | 8/1956 | Simmons et al. |
| 3,496,973 | A | 2/1970 | Ballard |
| 3,576,061 | A | 4/1971 | Pahlitsch |

(Continued)

FOREIGN PATENT DOCUMENTS

| | | |
|---|---|---|
| CN | 205166048 U | 4/2016 |
| EP | 3092889 A1 | 11/2016 |

(Continued)

OTHER PUBLICATIONS

European Search Report issued in counterpart application No. 19161967.5 dated Jul. 17, 2019. (11 pages).

*Primary Examiner* — Alicia Torres
(74) *Attorney, Agent, or Firm* — Taft Stettinius & Hollister LLP; Stephen F. Rost (57) ABSTRACT

A harvesting machine including a frame, a rotor assembly rotatably coupled to the frame configured to move crop material, and a plurality of knives movably attached to the harvesting machine. The rotor assembly includes a plurality of spaced apart rotating blades, wherein one or more of the plurality of knives extends into the spaces between the blades. Each of the plurality of knives includes a knife body and a cutting edge having a plurality of teeth, wherein each of the teeth includes a scallop or valley. Each one of the plurality of valleys extends from the knife body to the leading edge of one of the plurality of teeth, wherein adjacent valleys are located on opposite sides of the knife body. The valleys are lined with a wear resistant material to increase the longevity of the cutting edge and cutting ability.

10 Claims, 7 Drawing Sheets

(51) Int. Cl.
*A01F 15/00* (2006.01)
*B23P 15/28* (2006.01)

(56) References Cited

U.S. PATENT DOCUMENTS

| | | | |
|---|---|---|---|
| 3,658,106 A * | 4/1972 | Elsasser | B02C 18/20 |
| | | | 241/291 |
| 5,775,181 A * | 7/1998 | Carlsen | B23D 45/00 |
| | | | 76/112 |
| 5,823,449 A * | 10/1998 | Kooima | B01F 7/00008 |
| | | | 241/27 |
| 9,375,796 B2 | 6/2016 | Elliston et al. | |
| 10,022,880 B2 * | 7/2018 | McFarland | B26B 9/00 |
| 2007/0251368 A1 | 11/2007 | McFarlane | |

FOREIGN PATENT DOCUMENTS

| | | | | |
|---|---|---|---|---|
| GB | 438596 A * | 11/1935 | | B02C 18/365 |
| GB | WO96/04776 A1 | 2/1996 | | |

* cited by examiner

WEAR RESISTANT PRECUTTER KNIFE

FIELD OF THE DISCLOSURE

The present disclosure relates to a work machine for harvesting crop, and more particularly to a harvesting machine to cut crop including a precutter knife.

BACKGROUND

Hay and foraging equipment are utilized in the processing of plant material and include mowers, conditioners, flail choppers, windrowers, and balers for both dry and silage uses. A hay system, such as a square baler, includes a pickup mechanism, which picks crop material from the ground and supplies it to a bale-forming chamber. The bale-forming chamber receives the crop material and includes a plunger or piston that applies an axial force against an accumulation of the crop material to form a substantially square-shaped bale. The plunger or piston can further apply a force to a face of the bale to further densify the bale. Once the bale reaches a certain or desired density, the bale may be pushed and extruded out the rear of the baler.

Large square balers, round balers, and feeder wagons often include a pre-cutter feed-system to preprocess the crop to cut it to a shorter length before the bale formation to aid in mixing the crop into feed rations. The shorter length of crop is easier to mix compared to longer length crop.

The pre-cutter feed-system comprises of a series of knives mounted to a structure, normally called the floor. It is common for these knives to be mounted in such a way that they can be lowered to bale with the knives lowered, if it is desired to not cut the crop. If it is desired to cut the crop, the series of knives are raised to engage a rotor assembly that includes a plurality of teeth or tines. The plurality of knives extends into spaces located between the teeth or tines. The rotor assembly rotates with respect to the knives which are stationary to cut the crop.

The rotor tines are located on each side of one of the knives as the crop is fed between the rotors and the knives. The combination of slicing and shearing of the crop assures that the crop is cut as it is fed into the baler. Due to this mechanical action and the abrasiveness of the crop and sand or dirt embedded in the crop, an edge of the knife becomes dull to the point that its ability to cut crop is significantly diminished. To overcome this reduced cutting capability, the knives must be sharpened frequently, for instance, once a day. The sharpening operation requires a significant amount of time, which reduces the amount of time spent on harvesting. What is needed therefore is a knife that maintains its sharpness over a longer period of time so that the knives are sharpened less often.

SUMMARY

The present disclosure describes a knife for a harvesting machine having a unique configuration and a wear resistant material, that does not dull as quickly as traditional heat treated steels used in the manufacture of such knives. The shape of the knife and the location of the wear resistant material at the knife edge protects the cutting edge from impact, which can cause chipping.

In one embodiment, there is provided a harvesting machine including a forage knife for an agricultural vehicle, the forage knife configured to cut forage with a rotating blade. The forage knife includes a knife body having a longitudinal axis, a first side and a second side each defining a plane, and a cutting edge extending along the longitudinal axis and including a plurality of teeth each of which includes a leading edge and a trailing edge, wherein the leading edge extends from the trailing edge of an adjacent tooth. The forage knife further includes a plurality of valleys each of which extends from one of the first side and the second side to the leading edge of one of the plurality of teeth, wherein the valleys of adjacent teeth are located on opposite sides of the knife body.

In another embodiment, there is provided a harvesting machine including a main frame and a rotor assembly rotatably coupled to the main frame and configured to move crop material, wherein the rotor assembly includes a plurality of spaced apart rotating blades having a space located between each of the plurality of spaced apart rotating blades. A plurality of forage knives is movably attached to the harvesting machine, wherein each the plurality of forage knives includes a first position displaced from the plurality of spaced apart rotating blades and a second position engaged with the plurality of spaced apart rotating blades. Each of the plurality of forage knives includes: i) a knife body including a first side and a second side each defining a plane; and ii) a cutting edge extending along the longitudinal axis, wherein the cutting edge includes a plurality of teeth each of which includes a leading edge and a trailing edge. The leading edge extends from the trailing edge of an adjacent tooth. The forage knife further includes a plurality of valleys, wherein each one of the plurality of valleys extends from one of the first side and the second side to the leading edge of one of the plurality of teeth, wherein the valleys of adjacent teeth are located on opposite sides of the knife body.

In a further embodiment, there is provided a method of making a forage knife including: providing a piece of sheet steel having a centerline, a first side, and a second side; applying a pressure to the first side and the second side with a die applied to the steel body to form a plurality of valleys, wherein adjacent ones of the plurality of valleys are located on opposite sides of the piece of sheet steel; depositing a wear resistant material in each of the plurality of valleys; and applying a grinding tool to each of the valleys having the wear resistant material, wherein the grinding tool is applied to form a cutting edge at each of the valleys, the cutting edge of each of the valleys being disposed on either side of the centerline.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1A:
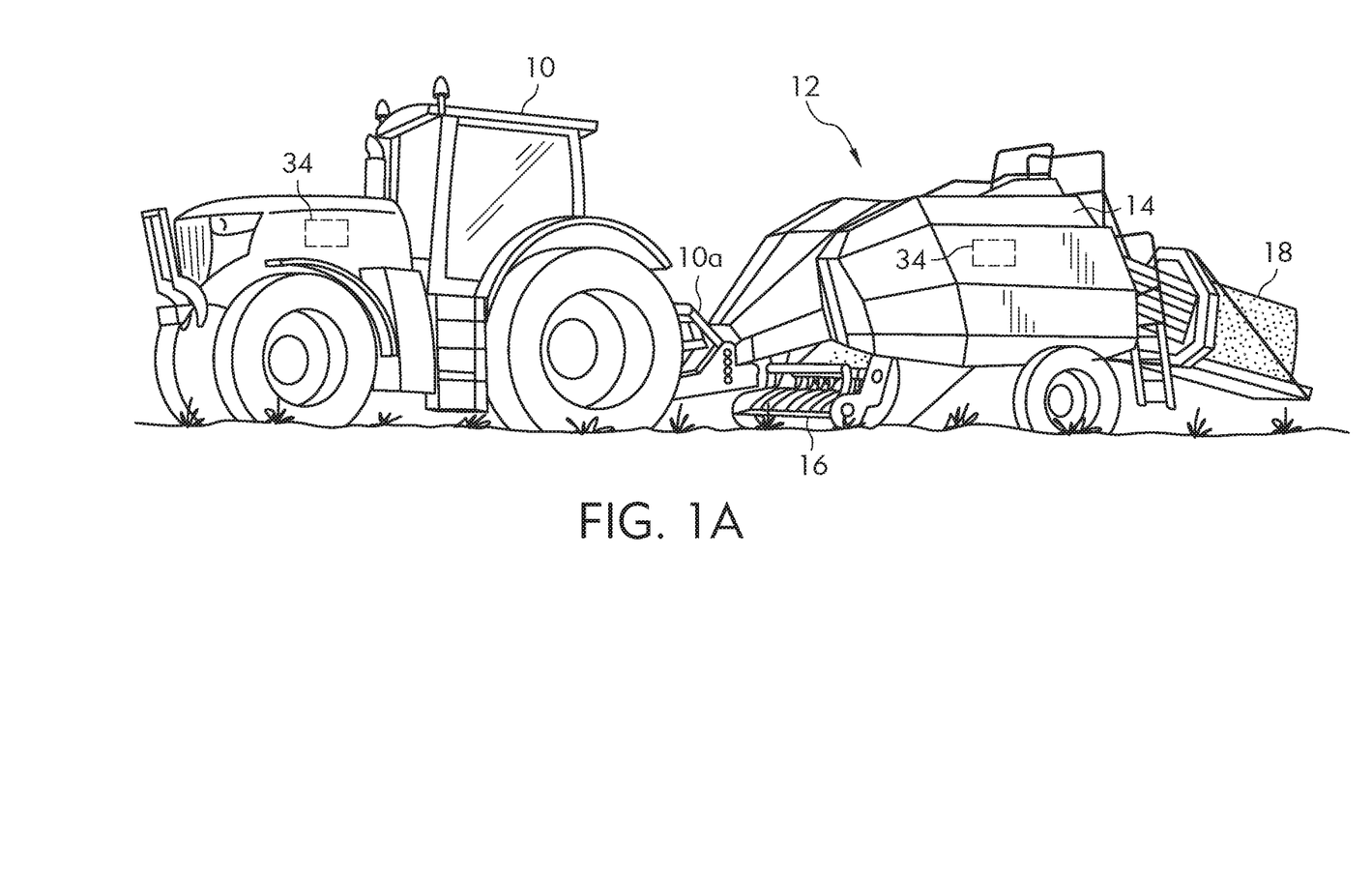
FIG. 1A is a perspective view of an example baler towed by an agricultural vehicle.

Referring now to FIG. 1A, large square baler 12 may be towed across a field by agricultural vehicle 10. (It will be understood that various other configurations are also possible. For example, the disclosed systems and methods may be utilized with a variety of balers or other harvesting equipment.) Baler 12 may include housing 14, which may generally shield various internal components of baler 12. As baler 12 moves across a field (e.g., as towed by vehicle 10 via connection 10a) and encounters a windrow or other arrangement of material (not shown), pick-up assembly 16 may gather the material and move it up and into housing 14 for processing. As a result of this processing, as described in greater detail below, bale 18 may be formed and may be ejected from the rear of baler 12.

In various embodiments, baler 12 (or vehicle 10) may include one or more computing devices, such as controller 34. Various alternative locations for controller 34 are depicted in FIG. 1A, including locations on vehicle 10 and baler 12. It will be understood that one or more controllers 34 may be employed and that controller 34 may be mounted at various locations on vehicle 10, baler 12, or elsewhere. Controller 34 may be a hardware, software, or hardware and software computing device, and may be configured to execute various computational and control functionality with respect to baler 12 (or vehicle 10). As such, controller 34 may be in electronic or other communication with various components and devices of baler 12 (or vehicle 10). For example, controller 34 within baler 12 may be in electronic communication with various actuators, sensors, and other devices within (or outside of) baler 12. Controller 34 may communicate with various other components (including other controllers) in various known ways, including wirelessly. The baler 12 and related embodiments thereto are further described in U.S. Patent Application Publication No. 2015/0208586, titled Baler Plunger-Position Sensor Assembly and Method, the disclosure of which is hereby incorporated by reference.

Figure 1B:
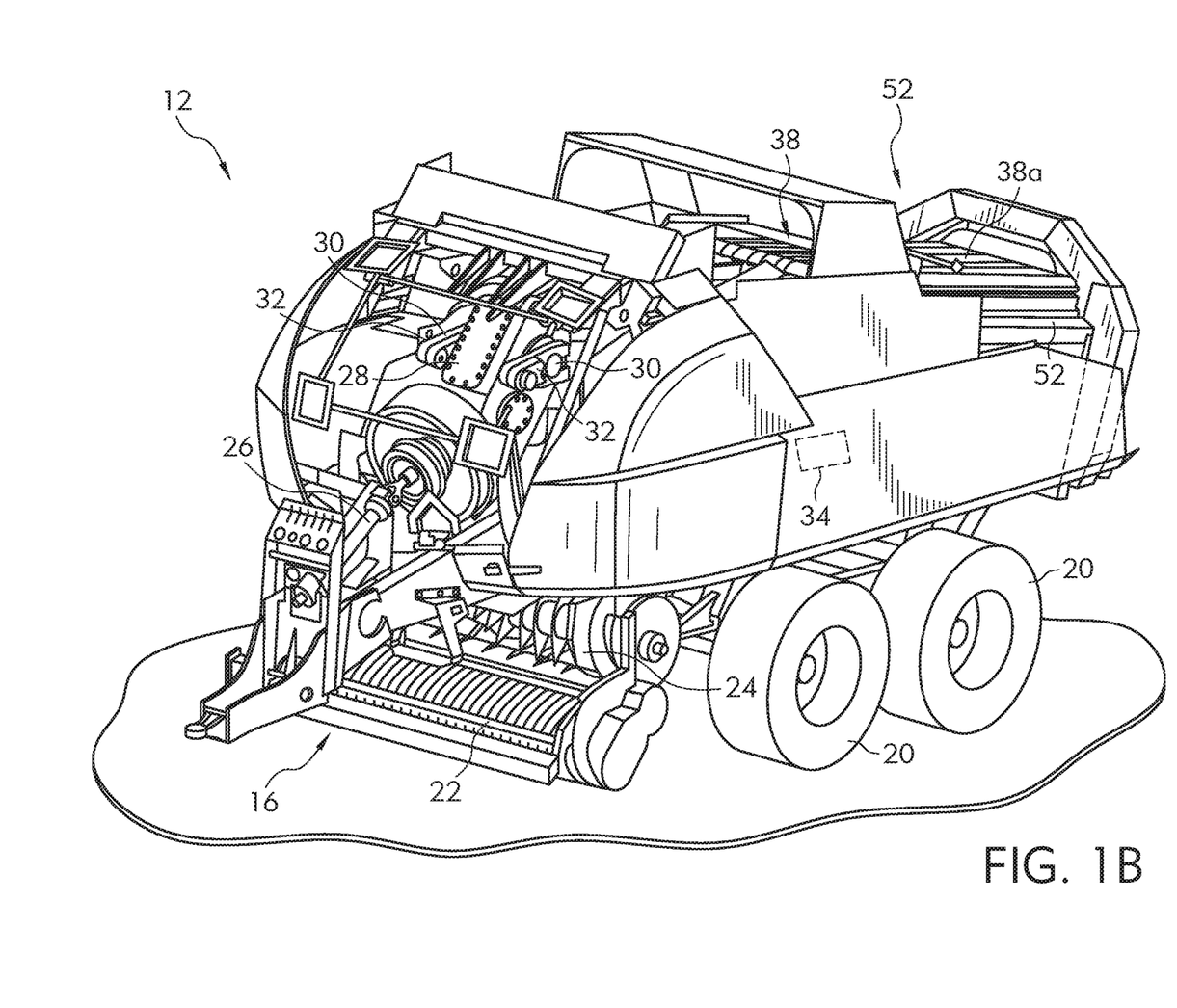
FIG. 1B is a perspective view of the baler of FIG. 1A, with portions of the cover of the baler removed.

Referring now also to FIG. 1B, various internal components of an example configuration of baler 12 are depicted. It will be understood that various other configurations may also be possible. Pick-up assembly 16, for example, may include rotary tine pick-up 22 for gathering crop material from a windrow (not shown). Material gathered by rotary tine pick-up 22 may be routed to feeder 24, which may further direct the material toward baling chamber 38 for compaction into a baler.

Baling chamber 38, which is depicted with upper panel 38a in place, may be a chamber of generally rectangular cross section extending axially along baler 12 in a generally front-to-back direction. Chamber 38 may be configured in various ways to receive material gathered by pick-up assembly 16, hold the material for compaction, then release the resulting bale from the back (or other portion) of baler 12 (e.g., as depicted for bale 18, in FIG. 1A).

Baling chamber 38 may be bounded on one or more sides (e.g., to the right and left, from the perspective of the forward direction of baler 12) by tension panels 52, which may be movable in order to control various aspects of a baling operation. For example, various actuators (not shown) may be mounted to baler 12 and one or more of tension panels 52 such that the actuators may cause tension panels 52 to vary the cross-sectional area of baling chamber 38. In certain embodiments, for example, hydraulic pistons (not shown) may be configured to pivot tension panels 52 into (or out of) baling chamber 38, in order to decrease (or increase) the cross-sectional area of chamber 38 and thereby increase (or decrease) the force required to push a given amount of compacted crop material through chamber 38 (e.g., the pressure required for plunger 54 to move the bale through chamber 38). In this way, for example, tension panels 52 may be utilized to vary the density of the resulting bale 18.

Compaction of crop material within baling chamber 38 may be driven in various ways. For example, as depicted in the various figures, a plunger (not shown in FIG. 1B) may be driven by a crank arm assembly. As depicted in FIG. 1B, power take off ("PTO") connection shaft 26 may be configured to receive rotational power from PTO shaft of vehicle 10 (e.g., via connection 10a, as shown in FIG. 1A). In certain embodiments, accordingly, whenever the PTO output of vehicle 10 is engaged, PTO connection shaft 26 may be receiving rotational power from vehicle 10. (It will be understood that various other configurations are also possible, such as configurations in which shaft 26 (or various other components of baler 12) may be selectively disengaged even if the PTO output of vehicle 10 is engaged.)

In various embodiments, PTO connection shaft 26 may provide rotational power to gear box 28. Through one or more internal gears (not shown in FIG. 1B), this power may be routed through gear box 28 to crank arms 30, which may be connected to plunger 54 via connecting rod(s) 32. (Connecting rods 32 have been partially removed in FIG. 1B, for clarity of presentation.) In this way, rotational power may be provided from vehicle 10 to crank arms 30. Crank arms 30, accordingly, may then drive the reciprocating motion of the plunger, via connecting rod(s) 32, in order to compact material within baling chamber 38 into formed bales 18. It will be understood that various other configurations may be possible. For example, in certain embodiments, gear box 28 may be powered by an electrical or hydraulic machine rather than by direct mechanical power from a PTO interface.

In various embodiments, rotation of PTO connection shaft 26 (e.g., as powered by the PTO output of vehicle 10) may additionally (or alternatively) provide rotational power to various components of baler 12. For example, the motion of various components of pick-up assembly 16, various tying mechanisms (not shown), pumps for hydraulic actuation of tension panels 38 (not shown), and so on, may be driven via power connections of various known types (e.g., chain or belt drives) to PTO connection shaft 26 or associated components.

A twine tying arrangement (not shown) may be provided for wrapping and tying multiple loops of twine about a completed bale. The bale tying cycle may be initiated by a bale length sensor arrangement (not shown) including a toothed metering wheel (not shown) mounted on a shaft (not shown) extending horizontally across and being rotatably mounted to the top of the baling chamber 38. The metering wheel may have a toothed periphery which extends into the baling chamber 38 and is contacted by a forming bale so as to be rotated as the bale grows in length. The rotation of the metering wheel is sensed and converted into a signal representing bale length, with a control signal being sent to initiate the tying cycle when the forming bale reaches a length corresponding to a desired bale length. An example of a twine tensioner or knotter system is described in U.S. Pat. No. 8,617,834 to Deere & Company, the disclosure of which is hereby incorporated by reference.

While a large square baler is described in FIGS. 1A and 1B, the present disclosure is not limited to large square balers, but includes round balers such as those found in U.S. Pat. Nos. 6,622,468, 6,640,699, 7,694,504, the disclosures of which are incorporated by reference herein. The round baler does not include a compression chamber as does the large square baler. The present disclosure, however, in not limited to a baler of a particular type, and is applicable to balers of different types including those having a precompression chamber, no precompression chamber, secondary rotors, or those having crop moving directly into a formation chamber. The present disclosure is also not limited to balers, but can also include other harvesting machines or crop processing machines such as chopping systems used on combines.

Figure 2:
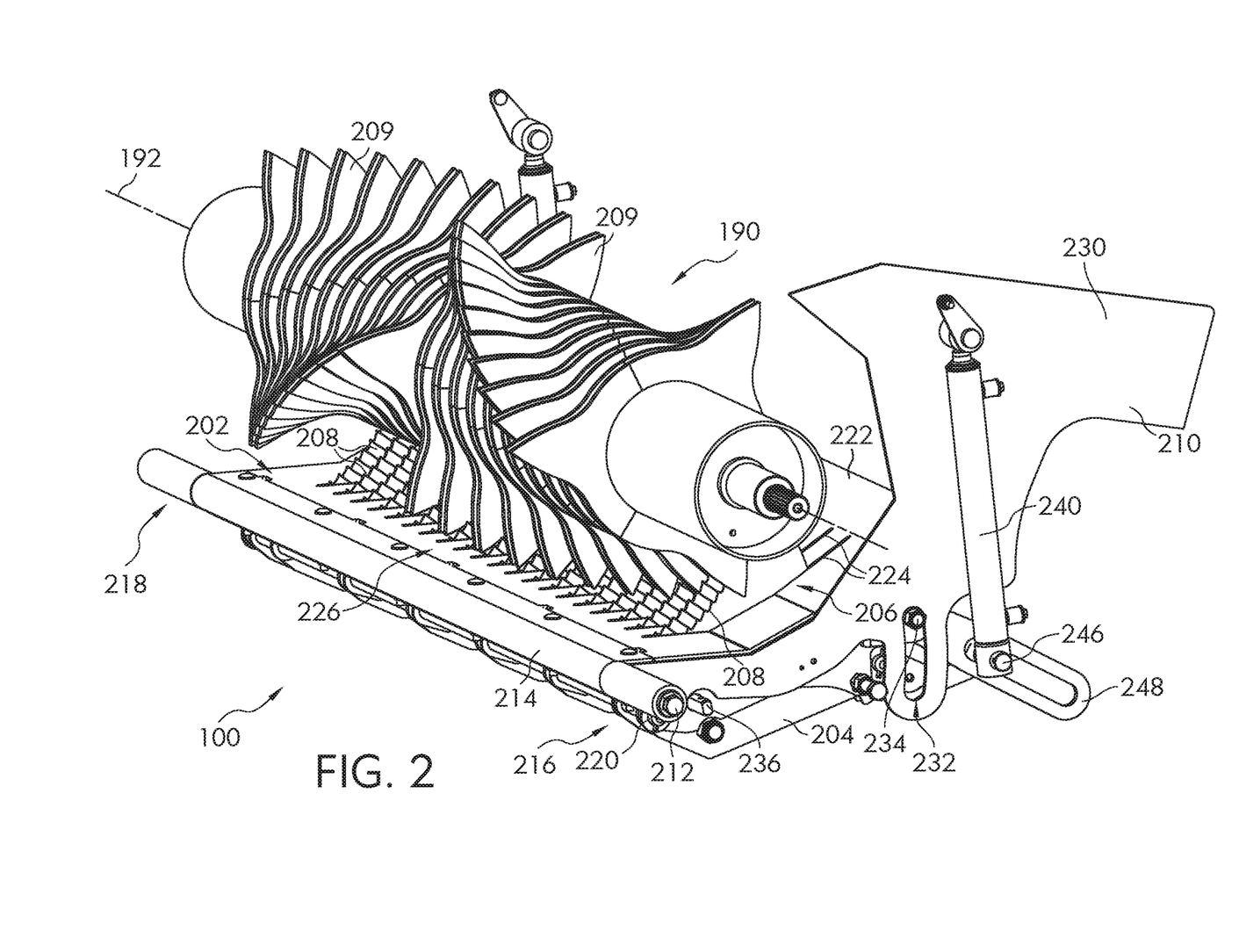
FIG. 2 is a front perspective view of the knife system assembly.

FIG. 2 illustrates a perspective view of a secondary feeder system 100. Once the crop is picked up by the pick-up mechanism 22, the crop moves to the secondary feeder system 100 which includes a rotor assembly 190 having a rotation axis 192 disposed above a knife system assembly including a top frame assembly 202 which is disposed above a bottom frame assembly 204. The bottom frame assembly 204 includes a knife support system 206 which supports a plurality of knives 208 configured to cut the crop passing into and through the rotor assembly 190. The knives 208 are also known as precutter knives. A baler frame 210 supports the top frame assembly 202 as well as the bottom frame assembly 204. The rotor assembly 190 includes a plurality of teeth or tines 209 and the plurality of knives 208 extend into spaces located between the teeth or tines to cut crop.

The top frame assembly 202 is pivotably coupled to the frame 210 at a pivot 212. The pivot 212 includes a shaft 214 supported by the baler frame 210 at a first end 216 and a second end 218. The bottom frame assembly 204 is pivotably coupled to the top frame assembly 202 at a pivot 220 which includes a shaft extending from one side to the other side of the top frame assembly 202.

While the pivot 212 is used to movably couple the top frame assembly to the baler frame 210, other mechanisms of relative movement between the two are contemplated. For instance, a spatial mechanism, which movably spaces the baler frame and the top frame are included. In one embodiment, the spatial mechanism is the planar mechanism. In another embodiment, a four bar linkage is operatively connected to the baler frame and to the top frame.

While the pivot 220 is used to movably couple the bottom frame assembly to the top frame assembly, other mechanisms of relative movement between the two are contemplated. For instance, a spatial mechanism, which movably spaces the top frame and the bottom frame are included. In one embodiment, the spatial mechanism is the planar mechanism. In another embodiment, a four bar linkage is operatively connected to the top frame and to the bottom frame.

A sheet 222, of the top frame assembly 202 includes a plurality of slots 224 configured such that the plurality of knives 208 extends through the sheet into a crop passageway 226. In one embodiment, a single knife 208 extends through a single slot 224. The knives 208 extend through the slots 224 to cut crop which moves over the surface of the sheet 222. Once the crop has been cut, the material continues over the sheet 222 and, in one embodiment, moves subsequently to a pre-compression chamber before continuing to a baling chamber. In another embodiment the cut crop moves over sheet 222 to a secondary rotor or directly into a bale chamber.

In one embodiment, the knives 208 are coupled to the top frame at a shaft 236 defining a pivot location for each of the knives and are also supported by the knife support system 206. Each of the knives 208 includes an aperture or hole 227 configured to receive the shaft 236. Each of the knives 208 is pushed through a respective slot 224 by a roller being forced against a ramp or cam shape that is integrated into the knife shape to push the knife through sheet 222 into the crop passageway. This will be referred to as the engaging force that is applied to a knife to move it to an operative position. Each of the knives 208 is biased to the cutting position by an associated spring. The knife moves through sheet 222 until the roller enters into a depression or notch 228 (See FIG. 3) in the knife that holds the knife in the raised position. This position will be referred to as the operative position of the knife. The notch is configured such that a relatively high force is necessary to move the spring loaded roller out of the notch to allow the knife to move out of the crop passageway in the case of hitting a foreign object. The retracted position may also be referred to as the protected position. The location of the pivot 220 with respect to the top frame assembly 202 is determined such that the spring length does not shorten excessively during operation, so that there is sufficient force to engage the knife with the roller in the notch and also for consideration to make sure the spring does not become unhooked. In still other embodiments, the baler does not include a roller and a spring. Other embodiments may include alternative mechanical members to provide the engaging force such as an actuator or compressive member.

Figure 3:
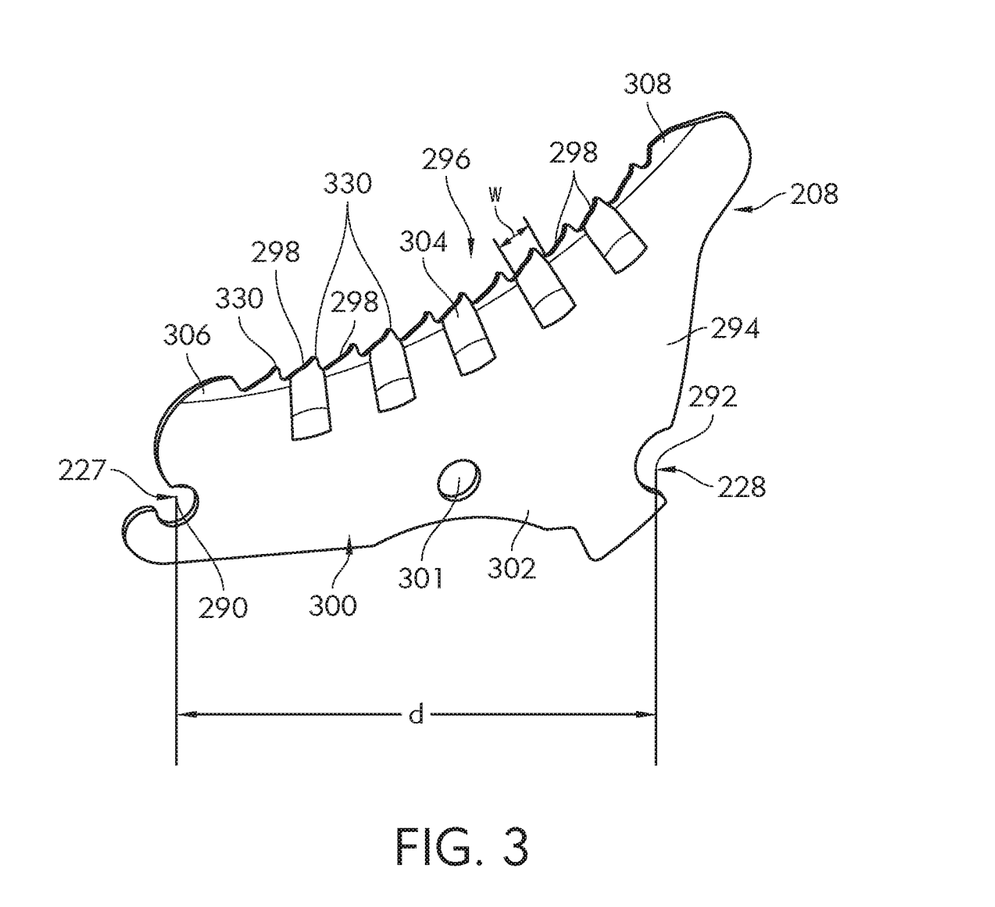
FIG. 3 is an elevational plan view of a knife.

FIG. 3 illustrates an elevational side view of the knife 208 including the aperture 227 located at one end of the knife 208 and the notch 228 located at another end of the knife 208. In one embodiment, a distance "d" between a center 290 of the aperture 227 to a center 292 of the notch 228 is about 10 inches. The knife 208 includes a knife body 294 made of a relatively hard material, such as steel, having a hardness sufficient to withstand the repeated stress from the cutting of crops as well as to provide a support structure for a cutting edge 296 including a plurality of teeth 298. Each of the plurality of teeth extends from a spline 300 defined by the knife body 294. The spline 300 extends along a longitudinal axis of the knife body 294. The knife body 294 includes a first side 302 and a second side 303 (see FIG. 4) disposed on the other side of the knife body 294. The first side 302 and the second side 303 are generally planar or flat such that one side is generally parallel with the other side. In one embodiment, the knife body 294 is 5 millimeters thick. A hole 301 is located in the knife body 294 for purposes of manufacturing. In other embodiments, the hole 301 is not included or is located at a different location.

Each of the teeth 298 includes a width "w" generally defined by a recessed portion or valley 304 of the knife body 294. The recessed portions 304 of each of the teeth 298 extends from the spline 300 to the cutting edge 296. Each of the recessed portions 304 includes a surface 305 which is inclined with the centerline 312 of FIG. 6. By inclining this surface 305, the cutting edge of each of the teeth is also inclined to improve the cutting operation. In one embodiment, the number of teeth 298 is eleven. The row of teeth 298 are located between a first sharpened portion 306 and a second sharpened portion 308 of the knife body 294 as seen in FIG. 3. In other embodiments, a different number of teeth is contemplated. In still other embodiments, the knife body 294 does not include one or both of the first and second sharpened portions 306 and 308.

Figure 4:
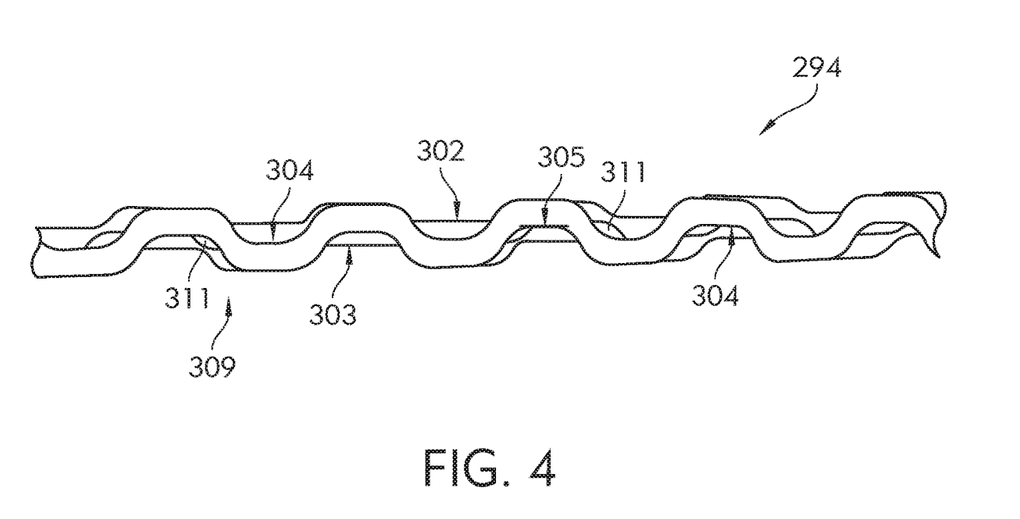
FIG. 4 illustrates an edge profile of the knife body of a knife.

FIG. 4 illustrates an edge profile 309 of the knife body 294 including the recessed portions 304 formed in a piece of sheet steel, but prior to preparing the cutting edge 296. As can be seen in FIG. 4, the first side 302 is spaced from a second side 303 of the steel body, such that the first side 302 and the second side 303 are generally parallel. In the illustrated embodiment, each of the recessed portions 304 are formed during a forging process applied to the steel body. The steel body is either cold forged or heat forged. A die that comes together applies a pressure to the steel body to form the recessed portions. The die forms each of the recessed portions 304 to form alternating valleys on either side of the knife. In this view, the cutting edge 296 has not been formed, since the edges of the valleys are substantially the same thickness as the steel body. The die forms the recessed portions for form the edge profile 309 in a corrugated configuration. Other embodiments are contemplated including forming the recessed portions by other manufacturing processes including casting, grinding, and lamination.

Once each of the recessed portions 304 are formed, a wear resistant material 311 is applied to each of the recessed 304 to provide a reinforced cutting edge having a harder cutting edge than would be provided if the wear resistant material was not applied to the steel body. In one embodiment, the thickness of the material 311 is about one (1) millimeter (mm). Other thicknesses are contemplated, including a range of thicknesses from 0.1 mm to 2 mm.

The material 311, in one embodiment, is a tungsten carbide material, which is harder than the steel body. Other types of carbides are contemplated. Other materials harder than the supporting steel body are also contemplated, such as chrome materials, nickel materials, and powder metal alloys. The materials are applied with a number of different application processes including fusing the applied material, hardfacing processes, spraying the material in the recess and then fusing, laser cladding, electrostatic application, or using high velocity oxygen fuel (HVOF) coating. Laser cladding and HVOC materials typically include a thickness toward the lower end of the range. Tungsten carbide is typically in the middle of the range. In other embodiments, a proprietary material of Deere & Company, identified as Gopalite® coating composition, is used and has a thickness toward the higher end of the range.

Figure 5:
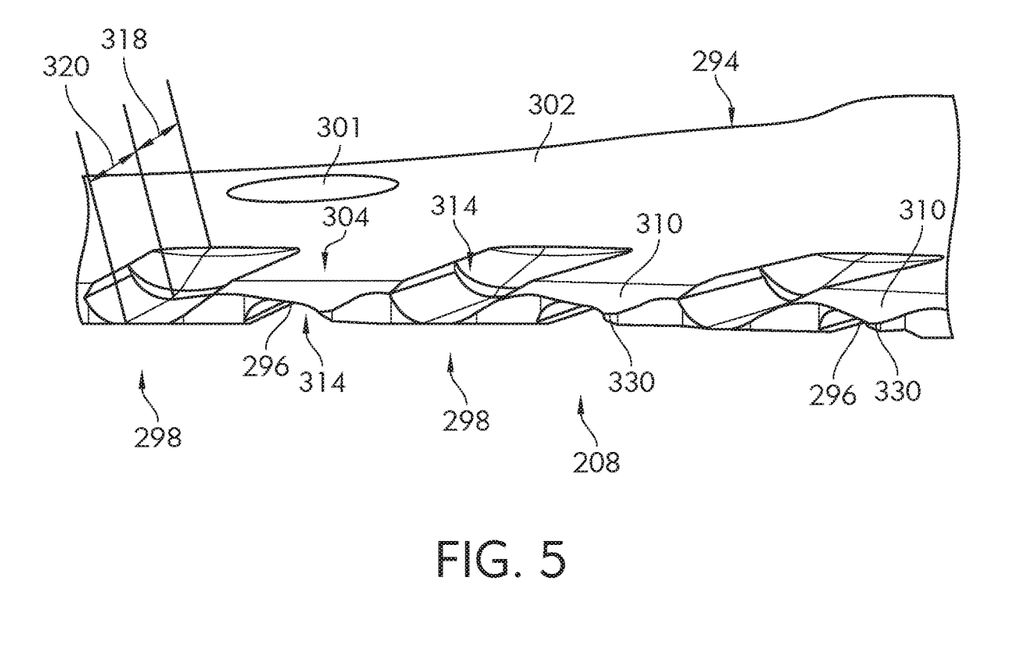
FIG. 5 is partial perspective view of a cutting edge of a knife.
Figure 6:
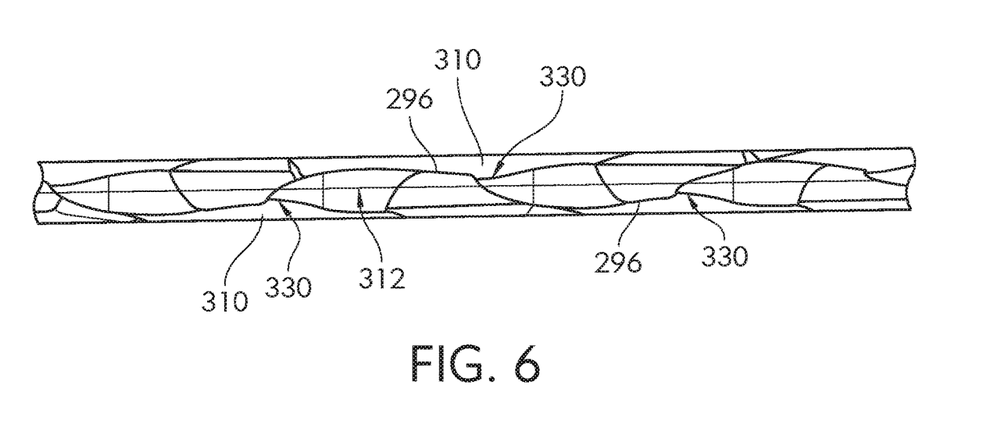
FIG. 6 is an end view of the cutting edge of a knife.

Once the edge profile 309 of FIG. 4 is formed, the cutting edge 296 is formed to provide the teeth 298 as illustrated in FIG. 5 and in FIG. 6. Initially, a bevel 310 is formed on either side of the knife body 294 to form a "V" edge terminating at a centerline 312. The centerline 312 is generally located along a plane extending through the knife body 294 equidistant between the first side 302 and the second side 303. In one embodiment, the bevel is about eight (8) degrees. In other embodiments, the bevel is between about five (5) degrees and fifteen (15) degrees. Other angles of bevels are contemplated. While in one embodiment, the bevel 310 is formed before the cutting edge is formed as described later herein, in other embodiments, the bevel 310 is formed after the cutting edge is formed.

After the bevels 310 are formed, each of the teeth 298 is formed to provide the cutting edge 296. In one embodiment, the cutting edge 296 of each tooth 298 is formed with a machine that grinds each of the valleys to form scallops 314 at alternating locations on either side of the knife body 294. The scallops are lined with the wear resistant material. The scallops 314, on each side of the knife body 294, include a forged first portion 318 and a ground second portion 320, each of which is inclined with respect to one of planar surfaces of the knife body 294. In one embodiment, first portion 318 results from the forging process and the second portion 320 results from the grinding process. The second portion 320 is relatively flat and extends from the first portion 318. A surface of the wear resistant material located at the second portion is inclined with a surface of the first portion resulting from the forging process. A width 321 of the scallop 314 is defined from one edge of the wear resistant material to another edge. (See FIG. 7) The width 321 is generally less than one inch and about eight tenths of an inch. Other widths are contemplated. In other embodiments, the scallops of each of the teeth are formed on the same side of the knife body 294. In still other embodiments, pairs or consecutive multiples of scallops are formed on one side and pairs or consecutive multiples of scallops are formed on the other side, such that multiple scallops on one side of the body alternate with multiple scallops on the other side of the knife body. In still other embodiments, a single scallop on one side of the knife body alternates with multiple scallops on the opposite side of the knife body.

The grinder removes a portion of the material located at the edge profile 309. In one embodiment, the grinder is applied to only the wear resistant material. A serrated edge 322 is formed at each of the recessed portions, where the serrated edge 322 on one side is faced with the wear resistant material 311 and on the other side is ground steel resulting from the bevel 310 formed of the steel of the knife body 294. To form the serrated edge 322, the grinder includes a grinding face angle with respect the generally planar surfaces of the knife body 294. In one embodiment, the grinding angle is an angle greater than the bevel angle. During the process, a portion of the material of the steel body and a portion of the wear resistant material are removed to form the cutting edge 296 having the contour of the serrated edge 322.

Figure 7:
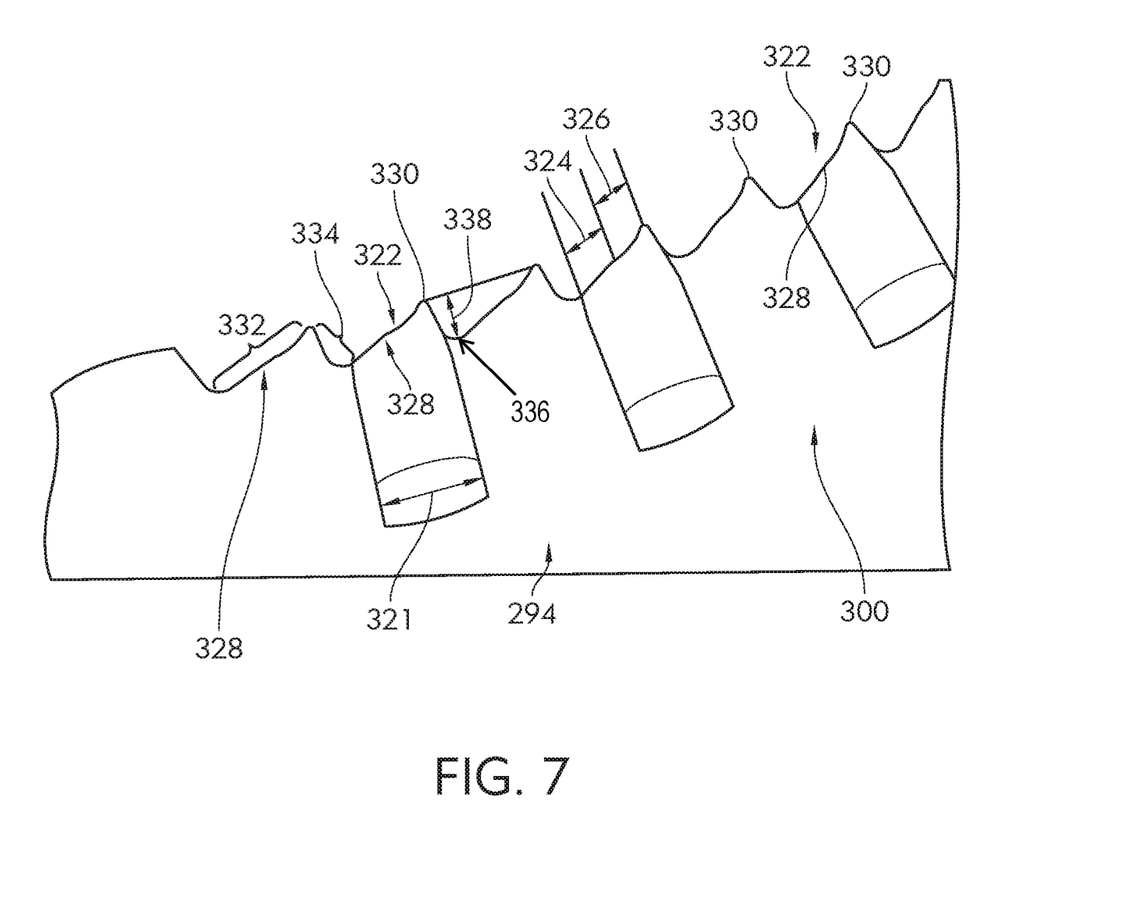
FIG. 7 is a side view of a knife showing a plurality of teeth.

As illustrated in FIG. 7, the serrated edge 322 includes a first portion 324 disposed adjacently to a second portion 326 having a peak 328 disposed therebetween. The grinding process also produces a tip 330 which is located at one end of the second portion. A leading edge 332 includes the first portion 324 and the second portion 326 and a trailing edge 334 is formed after the second portion 326 and the start of the wear resistant material of an adjacent tooth. 298. A difference between a height of the tip 330 and a location 336 at the serrated edge 322 forms a gullet 338. As can be seen in FIG. 6, the tips 330 of adjacent teeth 298 are located on either side of the centerline 312. Consequently, the cutting edges of the scallops 314 terminate on either side of the centerline 312.

As shown in the illustrated embodiments of FIG. 3 and of FIG. 7, the tips 330 follow a curved path having a predetermined radius measured from a known point, such as the rotation axis 192 of the rotor assembly 190 of FIG. 2. As the crop moves between the teeth 209 of the rotor assembly 190 and the knives 208, the crop slides along the cutting edge 296. Shear points between the teeth 209 and the knives 208 slice or cut the crop for baling.

The present disclosure employs one or more wear resistant materials that do not dull as quickly as traditional heat treated steels. The shape of the knife and the recessed areas position the wear resistant material at the knife edge while protecting the sharp edge from impact (which can cause chipping). Because the edge is more robust, the edge does not need to be sharpened as often. Should the edge become dull, however, the operator or another individual, can sharpen each of the edges that terminate the scallops. Once sharpened, the cutting edge of the knife retains its edge longer and provides increased productivity for the baling operation.

While embodiments incorporating the principles of the present disclosure have been disclosed hereinabove, the present disclosure is not limited to the disclosed embodiments. For instance, crop harvesting system employing a precutter type feed system including round balers (of all size and chamber types), square balers (of all sizes), and feeder wagons can be configured to incorporate the present disclosure. Also, any crop handling system which includes chopper systems for grain harvesting equipment, for example a combine chopper system, can employ the present disclosure. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A forage knife configured to cut forage with a rotating blade for an agricultural vehicle, the forage knife comprising:
a knife body including a longitudinal axis, a first side and a second side each defining a plane, a bevel located on at least one of the first side and second side, a cutting edge extending along the longitudinal axis including a plurality of teeth, each of which includes a leading edge and a trailing edge, the leading edge extending from the trailing edge of an adjacent tooth, and a plurality of valleys, wherein each one of the plurality of valleys extends from one of the first side and the second side to the leading edge of one of the plurality of teeth, wherein the valleys of adjacent teeth are located on opposite sides of the knife body, and further wherein the leading edge defines a relatively straight cutting edge interrupted by a peak, wherein the peak is defined on one side of the knife body by the bevel and on another side of the knife body by a scallop formed at one of the plurality of valleys.

2. A forage knife configured to cut forage with a rotating blade for an agricultural vehicle, the forage knife comprising:
a knife body including a longitudinal axis, a first side and a second side each defining a plane, a cutting edge extending along the longitudinal axis including a plurality of teeth, each of which includes a leading edge and a trailing edge, the leading edge extending from the trailing edge of an adjacent tooth, and a plurality of valleys, wherein each one of the plurality of valleys extends from one of the first side and the second side to the leading edge of one of the plurality of teeth, wherein the valleys of adjacent teeth are located on opposite sides of the knife body, and further wherein the leading edge defines a relatively straight cutting edge interrupted by a peak, and wherein the knife body includes a pivot hole located in the knife body defining a pivot axis about which the forage knife is configured to rotate.

3. The forage knife of claim 2 further comprising a wear resistant material disposed at each of the plurality of valleys, wherein the wear resistant material extends from the cutting edge to one of the first and second sides.

4. The forage knife of claim 3 wherein the wear resistant material comprises at least one of chrome, carbide, nickel, or tungsten.

5. The forage knife of claim 3 wherein the leading edge includes a relatively narrow cutting edge formed by a grinding tool.

6. The forage knife of claim 3 wherein the trailing edge is formed by a grinding tool.

7. The forage knife of claim 5 wherein the peak is formed by the grinding tool.

8. The forage knife of claim 2 wherein the knife body includes a notch configured to engage a roller.

9. The forage knife of claim 1 further comprising a plurality of flat portions, wherein each of the flat portions extends from the cutting edge of one of the plurality of teeth to a forged portion.

10. The forage knife of claim 9 wherein each of the plurality of teeth is defined by one of the plurality of valleys located on the first side of the knife body or by one of the plurality of valleys located on the second side of the knife body.

* * * * *